Dec. 6, 1966 CHIKARA HIRAYAMA 3,290,535
ELECTROLUMINESCENT LAMP HAVING A MOISTURE RESISTANT VITREOUS
LIGHT-TRANSMITTING MATERIAL WHICH INCLUDES 4 TO 8% LiF
Filed Oct. 31, 1961
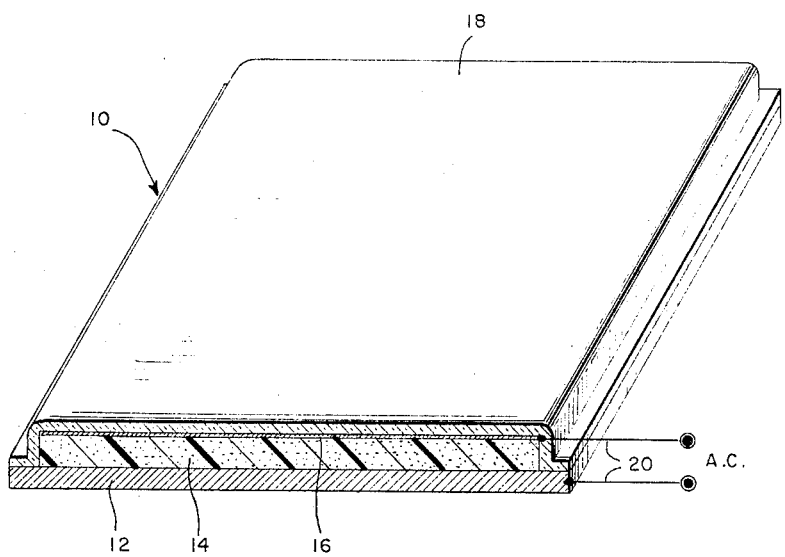
INVENTOR.
CHIKARA HIRAYAMA.
BY
W. D Palmer
ATTORNEY.

United States Patent Office 3,290,535
Patented Dec. 6, 1966

3,290,535
ELECTROLUMINESCENT LAMP HAVING A MOISTURE RESISTANT VITREOUS LIGHT-TRANSMITTING MATERIAL WHICH INCLUDES 4 TO 8% LiF
Chikara Hirayama, Murrysville, Pa., assignor to Westinghouse Electric Corporation, Pittsburgh, Pa., a corporation of Pennsylvania
Filed Oct. 31, 1961, Ser. No. 149,119
9 Claims. (Cl. 313—108)

This invention relates to electroluminescent devices and, more particularly, to ceramic-type electroluminescent devices and light-transmitting, vitreous cover coats therefor.

The phenomenon of electroluminescence is now well known and such devices have been marketed commercially. In one construction for such devices, finely divided phosphor is embedded in a glass or ceramic material in the form of a layer and the energizing electric field is applied across this layer to produce light. The phosphor which is generally used is copper-activated zinc sulfide. Zinc sulfide and other known electroluminescent phosphors display a relatively poor maintenance of initial light output in the presence of moisture. In other words, in the presence of moisture, the light output drops more rapidly during operation than when such devices are operated in a very dry atmosphere.

In order to inhibit this drop in light output, it has been customary to place a moisture-protecting layer over the moisture-previous portions of the device. In the case of a ceramic-type electroluminescent device, a ceramic moisture-protecting layer must meet fairly stringent requirements. In explanation, in the assembly of such ceramic-type devices, the phosphor-containing ceramic layer is first formed over an enameling iron substrate by firing at approximately 650° C. Over the phosphor-ceramic layer is formed the light-transmitting electrode, such as a layer of tin oxide. A protective or cover coat layer is then formed over this light-transmitting electrode. In order to prevent damaging the first-applied phosphor-dielectric layer, the cover coat must be formed at a temperature of less than about 650° C. In addition, the vitreous material of which this coat is formed must be sufficiently fluid at a relatively low temperature that it will flow readily and form a uniform, continuous thin layer in a relatively short period of time. Also, the coefficient of expansion desirably should approach that of the phosphor-containing vitreous layer. As an additional requirement, the so-called cover coat layer, when cooled, should be highly resistant to penetration by moisture, in order to protect the operative portions of the electroluminescent device. A good vitreous, light-transmitting cover coat which meets all of these requirements has not been available.

It is the general object of this invention to avoid and overcome the foregoing and other difficulties of and objections to prior art practices by the provision of a ceramic-type electroluminescent device having a vitreous, light-transmitting cover coat which is extremely resistant to penetration by moisture.

It is another object to provide a vitreous, light-transmitting material which when in a finely divided state can be heated to a temperature less than 650° C. to readily form a continuous layer, which layer when cooled is highly resistant to penetration by moisture.

The aforesaid objects of the invention, and other objects which will become apparent as the description proceeds, are achieved by providing a modified barium-borate glass system which contains appreciable amounts of magnesium oxide, zinc oxide and lithium fluoride. Limited amounts of other glass ingredients, namely calcium oxide, sodium oxide and aluminum oxide, are also desirably included in the glass. In order to achieve the desired effects, the relative proportions by weight of the individual glass constituents must be carefully balanced and relative weight percentage ranges are included.

For a better understanding of the invention, reference should be had to the accompanying drawing wherein the sole figure illustrates a perspective view of a ceramic-type electroluminescent device, an end of which is shown in section, and which device is provided with the vitreous, light-transmitting cover coat of the present invention.

With specific reference to the form of the invention shown in the drawing, the electroluminescent device 10 generally comprises a conducting substrate 12 over which is applied a phosphor-dielectric layer 14. A light-transmitting electrode layer 16 is carried over the layer 14 and the vitreous, light-transmitting cover coat 18 of the present invention is carried over the electrode layer 16. Lead-in wires 20 connect the electrodes 12 and 16 to a source of A.C. energizing potential.

As a specific example, the substrate 12 is formed of conventional enameling iron and the phosphor-dielectric layer 14 is formed of finely divided, copper-activated zinc sulfide phosphor embedded in glass dielectric material in the approximate proportions of one part by weight of phosphor per two parts by weight of glass dielectric. For a specific example of a suitable glass dielectric for embedding the phosphor, reference is made to copending application S.N. 78,156, filed December 23, 1960, and owned by the present assignee, now Patent No. 3,073,982. The electrode layer 16 is formed of tin oxide and the use of such an electrode layer is well known in the electroluminescent art.

The foregoing electroluminescent device is subject to considerable modification. For example, any conventional electroluminescent phosphor can be substituted for the zinc sulfide as specified. The relative proportions by weight of phosphor and dielectric are not critical and can be varied. In addition, other light transmitting electrode materials can be substituted for the preferred tin oxide.

The phosphor-dielectric layer 14, together with surrounding electrode layers 12 and 16, constitute the operative portion of the device. The enameling iron electrode-substrate 12 is quite impervious to moisture, but the electrode layer 16 is readily pervious to moisture and requires protection. In accordance with the present invention, the specific cover coat layer 18 of the present invention is provided over the electrode layer 16 and preferably extends beyond the electrode layer 16 and onto the enameling iron substrate 12.

The vitreous cover coat 18 of the present invention consists essentially of the following constituents in about the following relative percentages by weight: $B_2O_3$, 23–38%; $SiO_2$, 1–15%; BaO, 10–52%; ZnO, 5–27%; LiF, 4–7%; MgO, 2–8%; $Na_2O$, 0–5%; CaO, 0–8%; $Al_2O_3$, 0–6%. Because of the relatively high percentage of boric oxide, the present glass can be generally categorized as a borate-type glass. The relatively large percentage of barium oxide, together with the zinc oxide, provide the glass with a relatively low sag point, as will be explained in greater detail hereinafter. The magnesium oxide and lithium fluoride provide the glass with good moisture resistant characteristics. It is also desirable to include some aluminum oxide in the glass up to the maximum amount as specified, in order to improve the surface hardness of the formed cover coat layer to prevent scratching. The calcium oxide, if used, also imparts moisture-resistant characteristics to the glass and the sodium oxide acts as a flux to facilitate initial smelting.

The relative proportions by weight of the constituents which comprise the glass must be carefully controlled.

if the desired characteristics are to be obtained. For example, if the relative amounts of calcium and magnesium oxides are excessive, the softening and sag temperatures of the glass will be too high. If too much lithium fluoride is included in the glass, the light-transmitting characteristics thereof will be impaired. Sufficient boric oxide and silica are required in order to provide the glass with a low flow temperature and similarly, it is necessary to include the barium oxide and zinc oxide within indicated relative proportions by weight in order that the melting temperature of the glass will be sufficiently low.

In initially forming the glass, a batch composition containing the ingredients in the proper proportions is melted in a porcelain crucible in an electric furnace at a temperature of from 900° C. to 1100° C. and preferably from 900° C. to 1000° C. The batch is heated for approximately forty-five minutes and the molten composition is then poured onto a stainless steel plate which is externally cooled with cold water. This causes the glass to cool rapidly and shatter and it is thereafter crushed and ball milled with a suitable vehicle such as acetone to a mesh size of 200 or finer. Examples of specific batch compositions and their sag points are given in the following Table I, with the relative amounts of the batch constituents given in terms of the equivalent oxide, except for the lithium fluoride.

TABLE I.—MOLE PERCENT, BATCH COMPOSITION

| Batch | $B_2O_3$ | $SiO_2$ | BaO | ZnO | LiF | MgO | CaO | $Na_2O$ | $Al_2O_3$ | Sag pt., °C. |
|---|---|---|---|---|---|---|---|---|---|---|
| A | 30 | 10 | 15 | 20 | 15 | 10 | | | | 448 |
| B | 30 | 5 | 10 | 20 | 20 | 10 | 5 | | | 443 |
| C | 35 | 5 | 10 | 20 | 15 | 10 | 5 | | | 471 |
| D | 35 | 10 | 10 | 15 | 15 | 10 | | 5 | | 469 |
| E | 35 | 15 | 10 | 15 | 20 | 5 | | | | 467 |
| F | 35 | 10 | 20 | 10 | 15 | 5 | | | 5 | 466 |

In explanation of the term "sag point" in describing the properties of glass, this is the temperature at which the glass has a viscosity of approximately $10^{10}$ poises. Normally the sag point will be approximately 75° C. higher than the softening temperature of the glass. A low sag point is indicative that a glass frit will readily form into a continuous mass or layer when the glass is heated to a relatively low temperature.

The ingredients used in initially mixing the foregoing batches were boric oxide, silica, barium carbonate, zinc oxide, lithium fluoride, magnesia, calcium carbonate, sodium carbonate and aluminum oxide. Preferably these ingredients are dry mixed in a ball mill for at least one hour before smelting in the manner as indicated.

In the following Table II are listed the constituents of the smelted batches, in terms of weight percents of the final composition.

TABLE II.—WEIGHT PERCENT, BATCH COMPOSITION

| Batch | $B_2O_3$ | $SiO_2$ | BaO | ZnO | LiF | MgO | CaO | $Na_2O$ | $Al_2O_3$ |
|---|---|---|---|---|---|---|---|---|---|
| A | 28.2 | 8.1 | 31.1 | 21.9 | 5.3 | 5.4 | | | |
| B | 31.0 | 4.5 | 22.6 | 24.0 | 7.7 | 6.0 | 4.2 | | |
| C | 25.0 | 4.3 | 22.1 | 23.2 | 5.6 | 5.8 | 4.0 | | |
| D | 35.4 | 8.7 | 22.3 | 17.6 | 5.7 | 5.8 | | 4.5 | |
| E | 35.8 | 13.2 | 22.6 | 17.8 | 7.6 | 3.0 | | | |
| F | 30.6 | 7.5 | 38.2 | 10.1 | 4.8 | 2.5 | | | 6.3 |

To form an electroluminescent lamp such as shown in the drawing, the phosphor-dielectric layer 14 and the electrodes 12 and 16, which form the operative portion of the device 10, are first fabricated in conventional fashion. Thereafter the cover coat glass of the present invention is mixed in finely divided form with an 80% water-20% ethanol vehicle to form a slurry which is sprayed onto the electrode layer 16. Alternatively, a silk-screen process can be used to apply the glass frit. Thereafter, the applied frit is fired at a temperature of between 600 and 650° C., for example, for from 5 to 10 minutes, for example. This causes the frit to form a smooth, continuous, substantially transparent layer having a thickness of 5 mils.

The thickness of the present cover coat layer 18 is not critical but preferably is in the range of from 3 mils to 8 mils. Thicker cover coat layers may be difficult to apply and overly thin cover coat layers will limit the moisture protection properties of this layer.

The cover coats of the present invention have a coefficient of expansion which is just slightly less than the coefficient for the phosphor-dielectric layer 16. This is desirable since residual strains in the cover coat are slightly compressive in nature which assists in forming a very "tough" glass layer. The coefficients for the present cover coat vary from 75 to $85 \times 10^{-7}/°$ C. This range can be extended or varied, depending on the coefficient of the phosphor-dielectric layer.

In actual tests, lamps which incorporated the cover coat of the present invention were operated at 60 cycles, 120 volts in a chamber at a relative humidity of 98% and a temperature of 50° C. These lamps operated for thirty days and longer before failure. Under such conditions of operations, the best normal life which could be expected from lamps which were protected with other known cover coat layers was considerably less and a representative life was approximately two to three days.

The electroluminescent lamp, as shown in the drawing, is subject to some modification in that an additional layer of semiconductor material may also be included between the device electrode, as disclosed in the aforesaid copending application S.N. 78,156, filed December 23, 1960. In addition, intermediate layers may be applied over the electrode layer 16 before the cover coat of the present invention is applied. Alternatively, the phosphor can be formed as a continuous thin film, as disclosed in copending application S.N. 837,988, filed September 3, 1959, and owned by the present assignee, now Patent No. 3,044,902. In such case, a separate inorganic material layer can be included between the device electrodes or the phosphor film per se can be sandwiched between the device electrodes. The cover coat of the present invention is then placed over the moisture-pervious electrodes to protect the device.

It will be recognized that the objects of the present invention has been achieved by providing a ceramic-type electroluminescent device which has improved performance and maintenance of lumen output. In addition, there has been provided a vitreous, light-transmitting material which, when in finely divided state, can be heated to a temperature less than 650° C. to readily form a continuous layer and which layer, when cooled, is highly impervious to penetration by moisture.

While at best embodiments of the invention have been illustrated and described in detail, it is to be particularly understood that the invention is not limited thereto or thereby.

I claim as my invention:

1. A vitreous, light-transmitting material which in finely divided state can be heated to a temperature of less than 650° C. to readily form a continuous layer and which formed layer when cooled is highly resistant to penetration by moisture, said vitreous material consisting essentially of from about 23 to 38% by weight $B_2O_3$, from about 1 to 15% by weight $SiO_2$, from about 10 to 52% by weight BaO, from about 5 to 27% by weight ZnO, from about 4 to 7% by weight LiF, from about 2 to 8% by weight MgO, from about 0 to 5% by weight $Na_2O$, from about 0 to 8% by weight CaO, and from about 0 to 6% by weight $Al_2O_3$.

2. A vitreous, light-transmitting material which in finely divided state can be heated to a temperature of less than 650° C. to readily form a continuous layer, and which formed layer when cooled is highly resistant to penetration by moisture, said vitreous material consisting essentially of about 28% by weight $B_2O_3$, about 8% by weight $SiO_2$, about 32% by weight BaO, about 22% by weight ZnO, about 5% by weight LiF, and about 5% by weight MgO.

3. A vitreous, light-transmitting material which in finely divided state can be heated to a temperature of less than 650° C. to readily form a continuous layer, and which formed layer when cooled is highly resistant to penetration by moisture, said vitreous material consisting essentially of about 31% by weight $B_2O_3$, about 4% by weight $SiO_2$, about 23% by weight BaO, about 24% by weight ZnO, about 8% by weight LiF, about 6% be weight MgO, and about 4% by weight CaO.

4. A vitreous, light-transmitting material which in finely divided state can be heated to a temperature of less than 650° C. to readily form a continuous layer, and which formed layer when cooled is highly resistant to penetration by moisture, said vitreous material consisting essentially of about 35% by weight $B_2O_3$, about 4% by weight $SiO_2$, about 22% by weight BaO, about 23% by weight ZnO, about 6% by weight LiF, about 6% by weight MgO, and about 4% by weight CaO.

5. A vitreous, light-transmitting material which in finely divided state can be heated to a temperature of less than 650° C. to readily form a continuous layer, and which formed layer when cooled is highly resistant to penetration by moisture, said vitreous material consisting essentially of about 35% by weight $B_2O_3$, about 9% by weight $SiO_2$, about 22% by weight BaO, about 18% by weight ZnO, about 6% by weight LiF, about 6% by weight MgO, and about 4% by weight $Na_2O$.

6. A vitreous, light-transmitting material which in finely divided state can be heated to a temperature of less than 650° C. to readily form a continuous layer, and which formed layer when cooled is highly resistant to penetration by moisture, said vitreous material consisting essentially of about 36% by weight $B_2O_3$, about 13% by weight $SiO_2$, about 22% by weight BaO, about 18% by weight ZnO, about 8% by weight LiF, and about 3% by weight MgO.

7. In combination with an electroluminescent device the operative portion of which comprises spaced electrodes, one of which is light-transmitting, with electroluminescent phosphor embedded in light-transmitting vitreous material included between said spaced electrodes, the improvement which comprises, a vitreous light-transmitting layer over said light-transmitting electrode and exterior to the operative portion of said device, said vitreous layer consisting essentially of the following constituents within about the specified relative proportions by weight: 23% to 38% $B_2O_3$, 1% to 15% $SiO_2$, 10% to 52% BaO, 5% to 27% ZnO, 4% to 7% LiF, 2% to 8% MgO, 0 to 5% $Na_2O$, 0 to 8% CaO, and 0 to 6% $Al_2O_3$.

8. In combination with an electroluminescent device the operative portion of which comprises spaced electrodes, one of which is light-transmitting, with phosphor embedded in light-transmitting vitreous material included between said spaced electrodes, the improvement which comprises, a vitreous light-transmitting layer have a thickness of from about 3 to 8 mils over said light-transmitting electrode and exterior to the operative portion of said device, said vitreous layer consisting essentially of the following constituents within about the specified relative proportions by weight: 23% to 38% $B_2O_3$, 1% to 15% $SiO_2$, 10% to 52% BaO, 5% to 27% ZnO, 4% to 7% LiF, 2% to 8% MgO, 0 to 5% $Na_2O$, 0 to 8% CaO, and 0 to 6% $Al_2O_3$.

9. In combination with an electroluminescent device the operative portion of which comprises spaced electrodes, one of which is light-transmitting, with phosphor embedded in light-transmitting vitreous material included between said spaced electrodes, the improvement which comprises, a vitreous light-transmitting layer having a thickness of about 5 mils over said light-transmitting electrode and exterior to the operative portion of said device, said vitreous layer consisting essentially of the following constituents within about the specified relative proportions by weight: about 36% by weight $B_2O_3$, about 13% by weight $SiO_2$, about 22% by weight BaO, about 18% by weight ZnO, about 8% by weight LiF, and about 3% by weight MgO.

References Cited by the Examiner

UNITED STATES PATENTS

| | | | |
|---|---|---|---|
| 2,887,402 | 5/1959 | Ballard | 313—108.1 |
| 2,922,912 | 1/1960 | Miller | 313—108.1 |
| 2,965,784 | 12/1960 | Hoffman | 313—108.1 |
| 2,993,001 | 7/1961 | Shonebarger | 106—54 X |
| 3,005,721 | 10/1961 | Cerulli | 106—54 |
| 3,005,722 | 10/1961 | Cerulli | 106—54 |
| 3,095,311 | 6/1963 | Von Wranau | 106—54 |

JAMES W. LAWRENCE, *Primary Examiner.*

GEORGE N. WESTBY, DAVID J. GALVIN, C. R. CAMPBELL, R. JUDD, *Assistant Examiners.*